(12) United States Patent
Leena Mary Francis et al.

(10) Patent No.: US 12,526,404 B2
(45) Date of Patent: *Jan. 13, 2026

(54) SYSTEMS AND METHODS FOR PERFORMING DATA ANALYTICS ON SENSITIVE DATA IN REMOTE NETWORK ENVIRONMENTS WITHOUT EXPOSING CONTENT OF THE SENSITIVE DATA

(71) Applicant: Citibank, N.A., New York, NY (US)

(72) Inventors: Leena Mary Francis, Pondicherry (IN); Vaibhav Kumar, Monroe, NJ (US); Ashutosh Pandey, Brandon, FL (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/920,737

(22) Filed: Oct. 18, 2024

(65) Prior Publication Data

US 2025/0047836 A1 Feb. 6, 2025

Related U.S. Application Data

(63) Continuation of application No. 18/539,221, filed on Dec. 13, 2023, now Pat. No. 12,130,787, and a
(Continued)

(51) Int. Cl.
| | |
|---|---|
| *H04N 19/105* | (2014.01) |
| *G06F 3/06* | (2006.01) |
| *G06F 16/174* | (2019.01) |
| *G06F 16/215* | (2019.01) |
| *G06F 16/55* | (2019.01) |
| *G06F 16/58* | (2019.01) |
| *G06F 16/583* | (2019.01) |

(Continued)

(52) U.S. Cl.
CPC ......... *H04N 19/105* (2014.11); *G06F 3/0641* (2013.01); *G06F 16/174* (2019.01); *G06F 16/215* (2019.01); *G06F 16/55* (2019.01); *G06F 16/5838* (2019.01); *G06F 16/5846* (2019.01); *G06F 16/5866* (2019.01); *G06F 21/6245* (2013.01); *H04N 19/13* (2014.11)

(58) Field of Classification Search
CPC .... H04N 19/105; H04N 19/13; G06F 3/0641; G06F 16/174; G06F 16/215; G06F 16/55; G06F 16/5838; G06F 16/5846; G06F 16/5866; G06F 21/6245; G06F 3/0608; G06F 3/067
See application file for complete search history.

(56) References Cited

U.S. PATENT DOCUMENTS 7,882,083 B2 * 2/2011 Kataoka ............ G06F 16/90335
707/693
11,797,936 B1 * 10/2023 Betgar ........... G06Q 10/063114
(Continued)

*Primary Examiner* — Angelica Ruiz
(74) *Attorney, Agent, or Firm* — Foley & Lardner LLP

(57) ABSTRACT

Systems and methods for performing data analytics on sensitive data, such as deduplication are disclosed herein. A first request to perform a first data analytics operation for a set of sensitive data instances may be received. A first set of image representations for the set of sensitive data instances may be retrieved. A first sensitive data instance and a second sensitive data instance may be clustered into a first cluster. The first data analytics operation may be performed on the first cluster.

20 Claims, 9 Drawing Sheets

Related U.S. Application Data continuation of application No. 18/455,353, filed on Aug. 24, 2023, now Pat. No. 11,921,686, and a continuation of application No. 18/299,506, filed on Apr. 12, 2023, now Pat. No. 11,770,521.

(51) Int. Cl.
*G06F 21/62* (2013.01)
*H04N 19/13* (2014.01)

(56) References Cited

U.S. PATENT DOCUMENTS

| | | | | |
|---|---|---|---|---|
| 11,829,340 B1* | 11/2023 | Li | ............ | G06F 16/212 |
| 2005/0262190 A1* | 11/2005 | Mamou | ............ | G06Q 10/10 |
| | | | | 709/203 |
| 2014/0201171 A1* | 7/2014 | Vijayan | ............ | G06F 16/1748 |
| | | | | 707/692 |
| 2022/0382686 A1* | 12/2022 | Van Riel | ............ | G06F 3/0641 |

* cited by examiner

200

| Record ID 202 | Given Name 204 | Surname 206 | Postal Address 208 | Telephone Number 210 |
|---|---|---|---|---|
| 8001 | Arjun | Potter | 123 High St | +44 3204203 |
| 8002 | AJ | Potter | 123 High Street | 03204203 |
| 8003 | Anaya | Garcia | 324 Tulip Dr | +1-523-555-555 |

212 — row 8001
214 — row 8002
216 — row 8003

Record ID: 8001 — 222
Record ID: 8002 — 224
Record ID: 8003 — 226

FIG. 2B

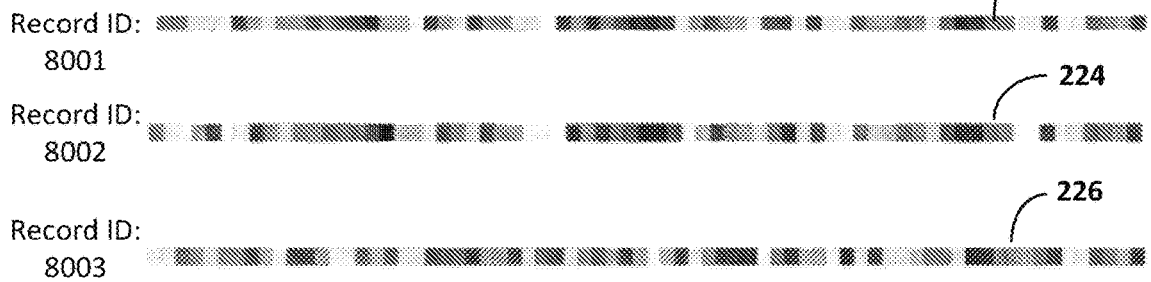

240

| Rid1_Cluster0.png | Rid2_Cluster0.png | Rid3_Cluster0.png | Rid4_Cluster0.png | Rid5_Cluster0.png | Rid6_Cluster0.png |
| Rid7_Cluster0.png | Rid8_Cluster0.png | Rid9_Cluster1.png | Rid10_Cluster1.png | Rid11_Cluster1.png | Rid12_Cluster1.png |
| Rid13_Cluster2.png | Rid14_Cluster2.png | Rid15_Cluster2.png | Rid16_Cluster2.png | Rid17_Cluster2.png | Rid18_Cluster3.png |
| Rid19_Cluster3.png | Rid20_Cluster3.png | Rid21_Cluster3.png | Rid22_Cluster3.png | Rid23_Cluster4.png | Rid24_Cluster4.png |

| | Algorithm: |
|---|---|
| 302 — 1 | Input → Record of data (Client Profiles) to be deduped |
| 304 — 2 | Output → Deduped Record of data (Client Profiles) |
| 3 | Function Preprocess( ) |
| 306 — 4 | Load $\alpha$ |
| 5 | If head Then |
| 6 | Ignore( ) |
| 7 | Else |
| 8 | For each $\beta$ in $\alpha$ do |
| 9 | Convert Small($\beta$) |
| 10 | Eliminate SpeChar($\beta$) |
| 11 | Replace ShForm($\alpha$) |
| 12 | Rewrite($\alpha$) |
| 308 — 13 | Function Encode( ) |
| 14 | Load $CC\gamma$ |
| 15 | Load $\alpha$ |
| 16 | For each $\beta$ in $\alpha$ do |
| 17 | $(CC\gamma(\beta))' = $ Replace$(CC\gamma(\beta))$ |
| 18 | Compress$(CC\gamma(\beta))''$ |
| 19 | Store$(CC\gamma(\beta))''$ |
| 310 — 20 | Function Decode( ) |
| 21 | Load $\delta$ |
| 22 | For each $\delta$ do |
| 23 | $(TC\gamma(\delta))' = $ Replace$(TC\gamma(\delta))$ |
| 24 | $(TC\gamma(\delta))'' = $ Pad$(TC\gamma(\delta))'$ |
| 25 | Return$(TC\gamma(\delta))''$ |
| 312 — 26 | Function Main( ) |
| 27 | Load $\alpha$ |
| 28 | Extract $\chi\alpha$ from $\alpha$ |
| 29 | $(\chi\alpha)' = $ Preprocess $(\chi\alpha)$ |
| 30 | $(\chi\alpha)'' = $ Encode$(\chi\alpha)'$ |
| 31 | Load $(\chi\alpha)''$ |
| 32 | Load $AffPro( )$ |
| 33 | Tune $AffPro(\sigma)$ |
| 34 | $\sigma'' = AffPro(\sigma((\chi\alpha)''))$ |
| 35 | $\Delta = $ Decode$(\sigma'')$ |
| 36 | Return$(\Delta)$ |

FIG. 3

| Term 402 | Possible Variation 404 |
|---|---|
| Junior | Jr |
| Sr | Senior |
| Ed | Edward |
| William | Bill |
| Bob | Robert |
| Vignesh | Vicky |
| Marie | Mary |
| L C Rajan | Lourdu Chinnappa Rajan |
| Sr Andrae | Senior Andrew |
| Rue St | Rue Street |
| Ave Francis | Avenue Francis |
| W, N, E, S | West, North, East, South |

| Algorithm 504 | More than 95% Duplicated Data 506 | |
|---|---|---|
| | Clustering Techniques 508 | |
| | Alpha – 3F 510 | Alpha – 6F 512 |
| k-Means | 84.5 | 83.39 |
| Affinity Propagation | 84.31 | 82.66 |
| Optics | 66.36 | 66.36 |
| | Hashing Techniques 514 | |
| Dhash | 33.21 | 40.4 |
| Phash | 30.08 | 31.73 |
| Ahash | 33.96 | 35.42 |

FIG. 5A

| Algorithm 524 | More than 95% Duplicated Data 526 | | 90% Duplicated Data 528 | | 80% Duplicated Data 530 | |
|---|---|---|---|---|---|---|
| | Alpha – 3F | Alpha – 6F | Alpha – 3F | Alpha – 6F | Alpha – 3F | Alpha – 6F |
| Affinity Propagation | 84.31 | 82.66 | 73.27 | 73.27 | 51.15 | 51.05 |
| D-hash | 33.21 | 40.4 | 25.92 | 25.92 | 22.02 | 22.02 |

FIG. 5B

SYSTEMS AND METHODS FOR PERFORMING DATA ANALYTICS ON SENSITIVE DATA IN REMOTE NETWORK ENVIRONMENTS WITHOUT EXPOSING CONTENT OF THE SENSITIVE DATA

CROSS-REFERENCE TO RELATED APPLICATIONS

This application is a continuation of U.S. patent application Ser. No. 18/539,221, filed Dec. 13, 2023, which is a continuation of U.S. patent application Ser. No. 18/455,353, filed Aug. 24, 2023, which is a continuation of U.S. patent application Ser. No. 18/299,506, filed Apr. 12, 2023. The contents of the foregoing applications are incorporated herein in their entirety by reference.

BACKGROUND

Communication networks are increasingly becoming more complex as computer systems move from a single computer to a network of computers. In fact, networks are increasingly moving to cloud computing platforms and/or arrangements where the computing services (e.g., software, analytics, storage, and/or intelligence) as provided by servers, databases, and/or other hardware that is dispersed over the Internet ("the cloud"). The benefits of the use of the cloud and/or computer networks, in general, provide increased scalability, flexibility, and/or functionality over single computers.

Due to the complexity of the communication networks, data may be stored in both technically and geographically remote places. That is, in a typical cloud computing environment, data may be stored on a piece of hardware (e.g., a server) located in one location (e.g., one country) as well as stored on another piece of hardware (e.g., another server) in another location (e.g., another country). One or more systems may need to draw upon this data to perform one or more computing services and thus require accessing data from technically and geographically remote places. In some instances, this access may create novel technical challenges.

For example, many data analytic applications including data collection, data deduplication, and/or other data analysis requires a review of data for its content and/or one or more determinations made on that content. However, review of the content of this data from technically and geographically remote places raises both privacy and security concerns. As one such example, sensitive data (e.g., Personal Identifiable Information ("PII"), which may include information that permits an identity of an individual to whom the information applies to be reasonably inferred by either direct or indirect means) may be subject to regulations that prevent the sharing of this data across jurisdictional boundaries (e.g., allowing a server located in one country to access data on another server in another country). Because of these regulations, it may not be technically feasible to perform any data analytics (e.g., data deduplication) on this data or other data in such diverse network environments.

SUMMARY

Systems and methods are described herein for novel uses and/or improvements for performing data analytics in remote network environments. As one example, systems and methods are described herein for performing data analytics (e.g., data deduplication) on sensitive data (e.g., PII) in remote network environments (e.g., a server located in one country requesting access to data on another server in another country) without exposing content of the sensitive data (e.g., both to a user or an algorithm).

For example, existing systems for data deduplication require either a user or an algorithm to verify the content of the data to be deduplicated. However, if such data includes sensitive data (e.g., PII) for which regulations prevent it to be shared across jurisdictional boundaries, these existing systems will require violating the regulations to perform the deduplication. Notably, these regulations apply both to a user (e.g., a user accessing data to confirm the content) or an algorithm (e.g., a natural language processing algorithm). Accordingly, existing systems, whether implementing a manual or automatic review, require exposing the content of the sensitive data.

In contrast, systems and methods are described herein for performing data analytics on sensitive data in remote network environments without exposing content of the sensitive data. To achieve this, the systems and methods perform an initial pre-processing step to generate encodings based on the original sensitive data. For example, while existing systems begin with exact copies of the original data thus leading to the sensitive data being exposed and/or discoverable to the existing system, the systems and methods described herein encode the sensitive data such that the visibility of the data is hidden to both users and algorithms.

In particular, the systems and methods use an encoding that generates a unique image representation in which alphanumeric characters are replaced with colors (or color gradients, intensities, hues, saturations, and/or temperatures to increase the complexity to higher dimensions) accordingly to a mapping template unique to the sensitive data. The system may then cluster (e.g., via unsupervised learning) image representations generated from different instances of sensitive data to determine a subset of sensitive data likely to be the identical, similar or nearly similar. The systems and methods may then retrieve the image representations along with record identifiers identifying the instance of sensitive data to which the image representation corresponds, which may be decoded and/or used for further data analytics.

BRIEF DESCRIPTION OF THE DRA WINGS

FIG. 1 shows an illustrative flowchart for a system for performing data analytics on sensitive data, in accordance with one or more embodiments.

FIGS. 2A-C show illustrative depictions of data instances and corresponding image representations, as well as clusters of image representations, in accordance with one or more embodiments.

FIG. 3 shows an illustrative algorithm for performing data analytics on sensitive data, in accordance with one or more embodiments.

FIG. 4 shows an illustrative data structure demonstrating variations of features within data instances, in accordance with one or more embodiments.

FIGS. 5A-B show illustrative data structures demonstrating clustering techniques for performing data analytics on sensitive data, in accordance with one or more embodiments.

Figure 6:
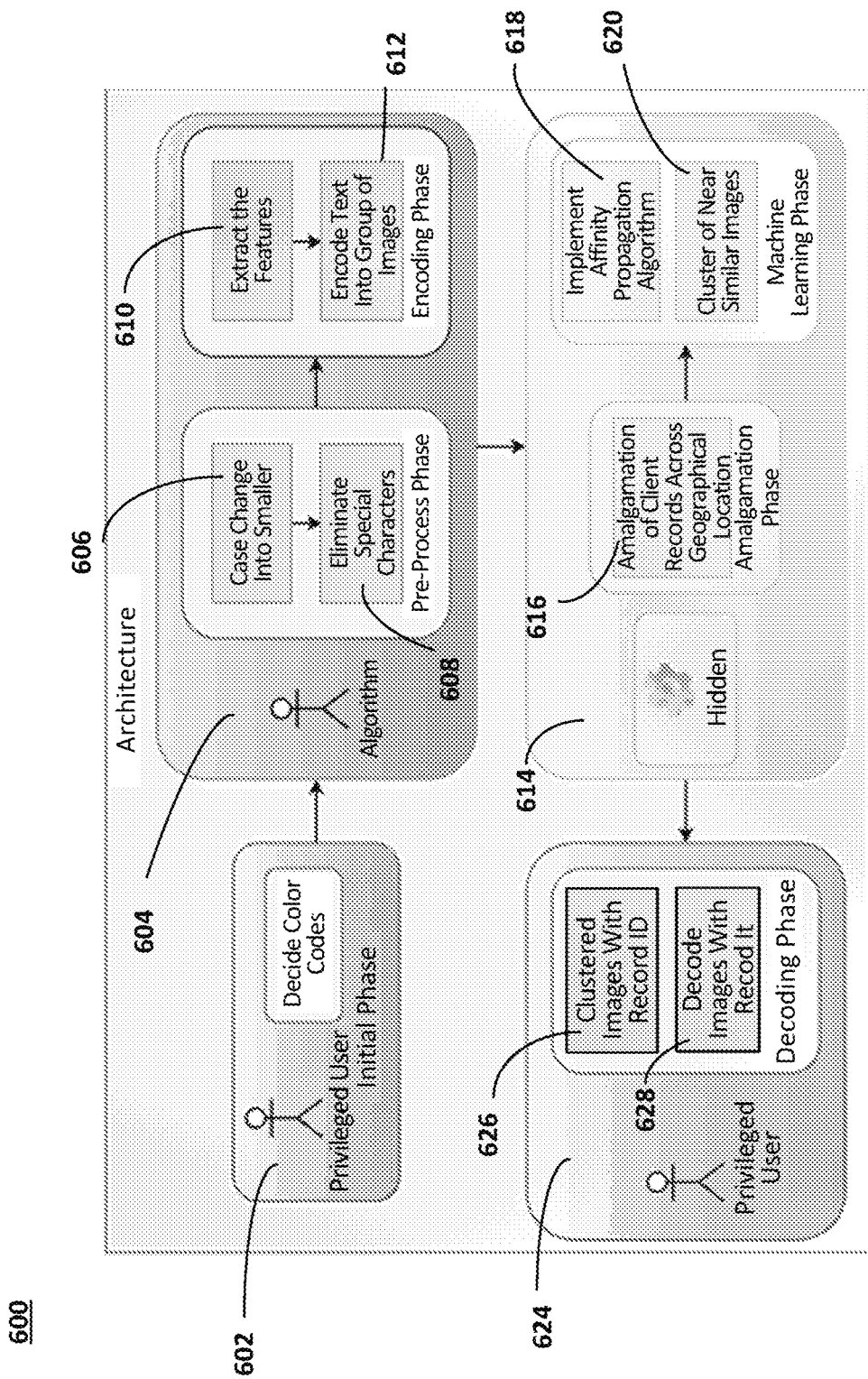

FIG. 6 shows an illustrative diagram demonstrating an illustrative architecture for a system that performs data analytics on sensitive data, in accordance with one or more embodiments.

Figure 7A:
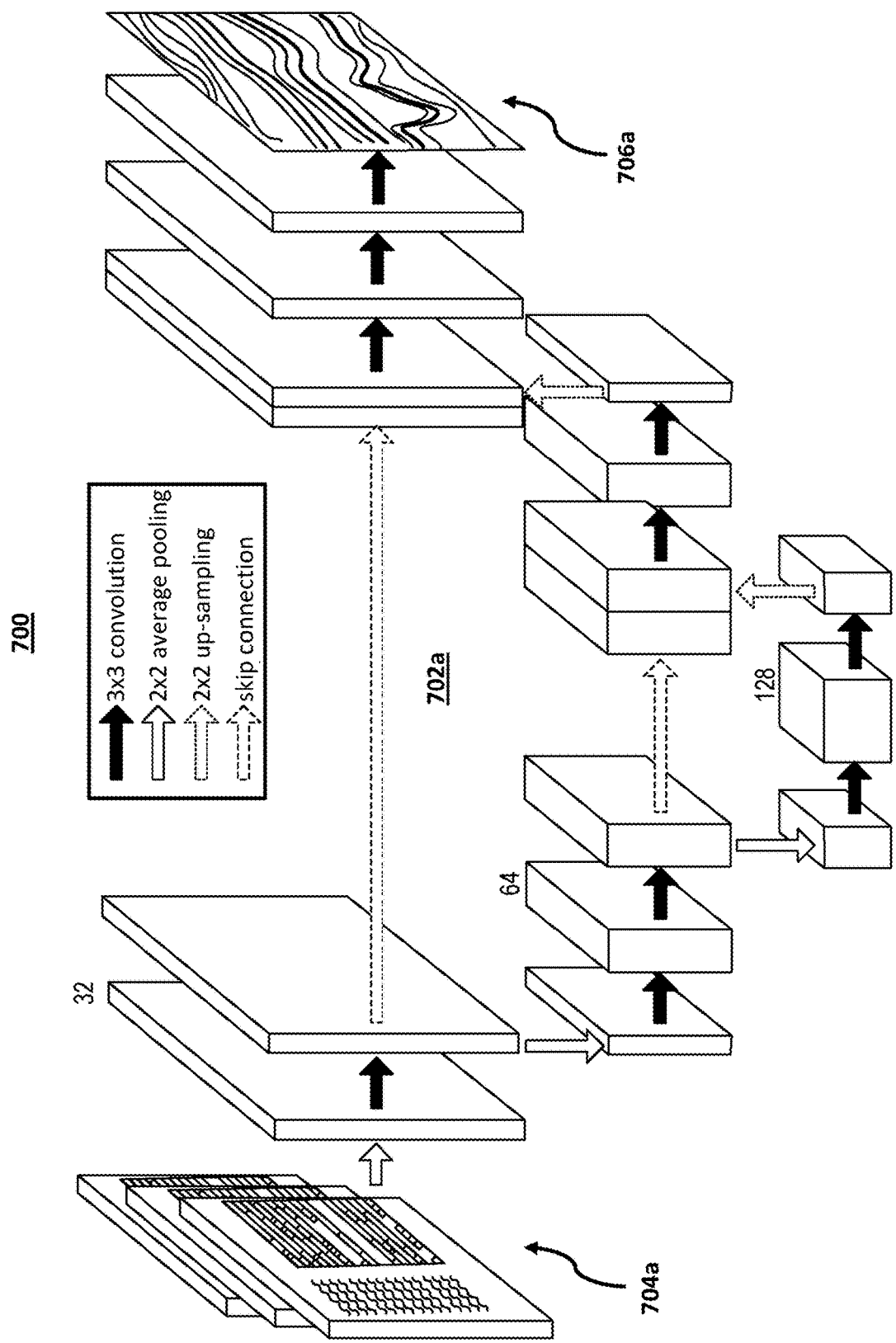
Figure 7B:
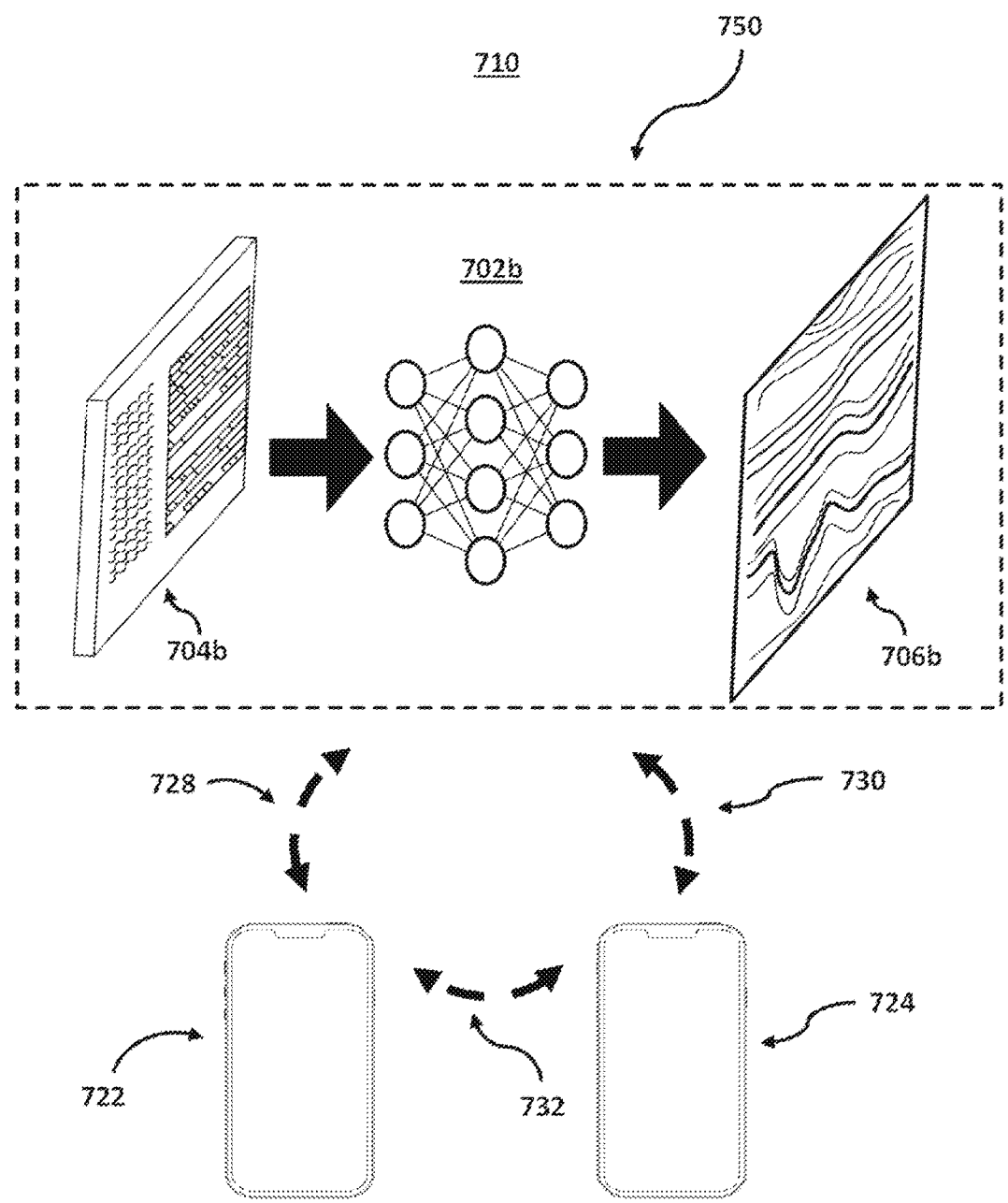

FIGS. 7A-B show illustrative components for a system used to perform data analytics on sensitive data, in accordance with one or more embodiments.

Figure 8:
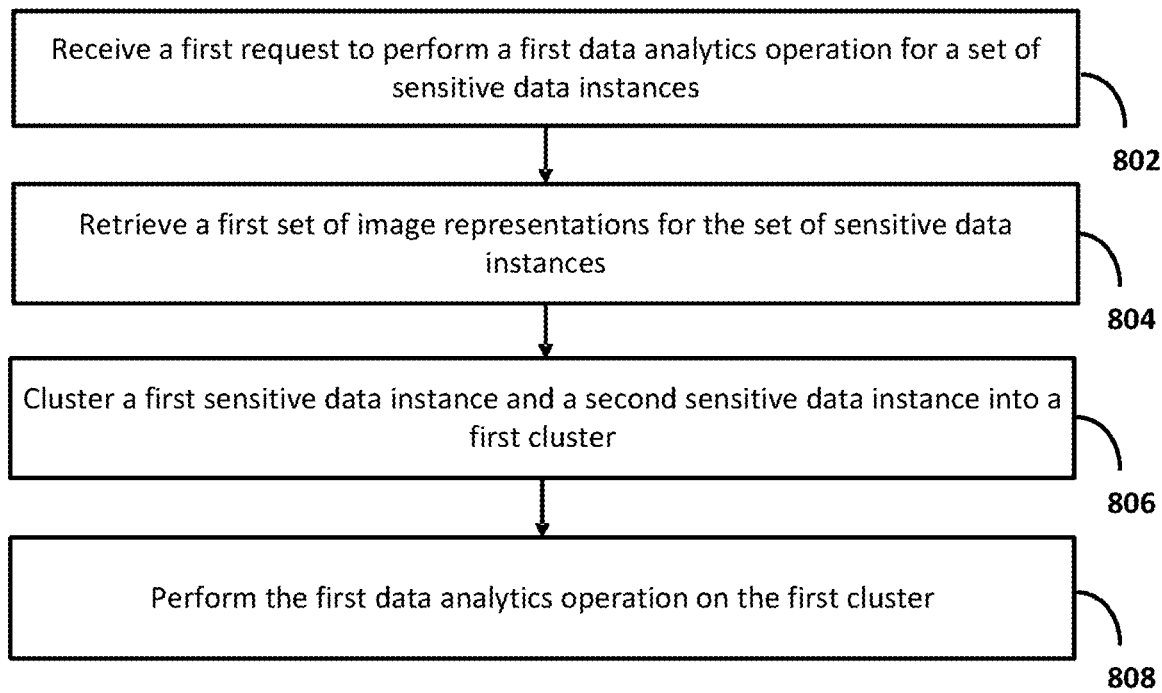

FIG. 8 shows a flowchart of the steps involved in performing data analytics on sensitive data using image representations of sensitive data instances, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
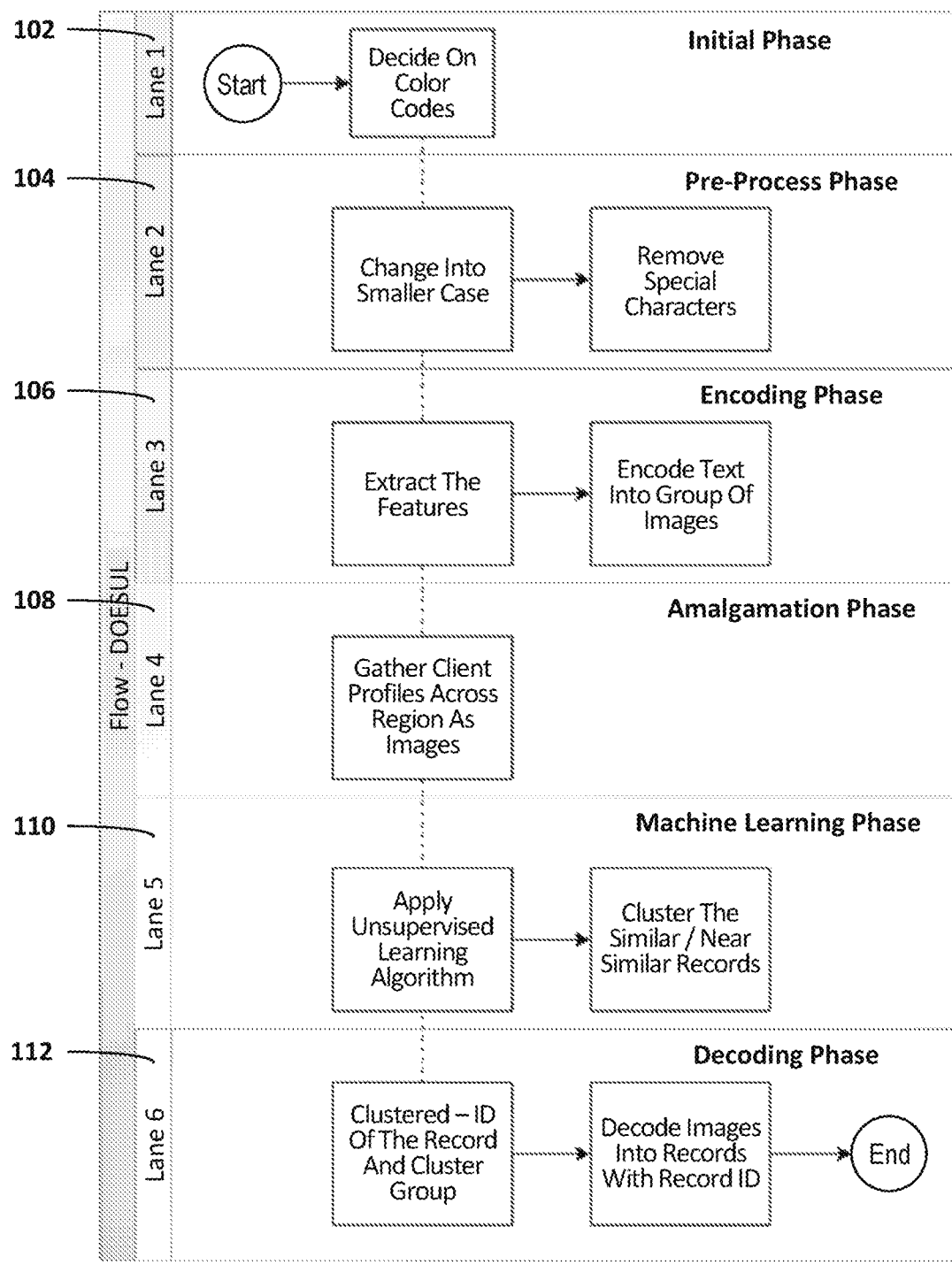

FIG. 1 shows illustrative flowchart 100 for a system for performing data analytics on sensitive data, in accordance with one or more embodiments. For example, the system may enable processing of data or other information where such data may be confidential, privileged or personal (e.g., in the case of PII). In disclosed embodiments, the system may enable deduplication of confidential data in a manner that does not use the confidential data itself.

For example, the system may handle unconventional deduplication, where handled data instances are not the exact replicates. Rather, the data may exhibit similar or near similar identification and may contain confidential data that cannot be processed in a raw form due to privacy or security constraints. As an illustrative example, the system may enable deduplication of names and near similar names in user databases, where large quantities of user data may be stored. For example, the system enables identification of data instances corresponding to the same users. By doing so, the system enables deduplication of, for example, data corresponding to Vignesh Roy and Vicky Roy, or W. Thomson and William Thomson etc. In some cases, such as in the case of health information, data corresponding to users may not be shared across various geographical locations legally. As such, the system enables such data to be deduplicated without the data being visible to the data processing system or any unauthorized users.

For example, at operation 102 as shown in flowchart 100 of FIG. 1, the system may determine a mapping template, which enables encoding of sensitive data through corresponding image representations. For example, the system may receive a first request to perform a first data analytics operation for a set of sensitive data instances. In some embodiments, the system may receive a request from one or more users to determine the presence of duplicate data entries within a dataset of sensitive data, such as health or financial records. By doing so, the system may process requests for data analytics on demand, based on specifications or requirements received through a request from a user. However, if such data includes sensitive data (e.g., PII and/or other non-public information) for which regulations prevent it to be shared across jurisdictional boundaries, these existing systems will require violating the regulations to perform the deduplication. The system may use an encoding that generates a unique image representation in which alphanumeric characters are replaced with colors (or color gradients, intensities, hues, saturations, and/or temperatures to increase the complexity to higher dimensions) accordingly to a mapping template unique to the sensitive data.

At operation 104, the system may pre-process sensitive data corresponding to users. As an illustrative example, the system may pre-process data that contains personal identifiable health or biometric information, such as birthdates, blood types and names. Such sensitive data may not normally be accessible from all devices or geographic regions due to, for example, privacy or security laws. For example, the system may convert characters corresponding to text into lowercase, and/or remove special characters that are not alphanumeric in nature (e.g., punctuation marks, stars, or other symbols). In some embodiments, the system may perform an initial pre-processing step to generate encodings of data based on the original sensitive data. For example, while existing systems begin with exact copies of the original data thus leading to the sensitive data being exposed and/or discoverable to the existing system, the systems and methods described herein encode the sensitive data such that the visibility of the data is hidden to both users and algorithms.

At operation 106, the system may extract features from the pre-processed sensitive data. For example, the system may extract names, contact information, or biometric information, which may subsequently be encoded into groups of images through use of the determined mapping template (e.g., by generating colors, color temperatures, color hues, color gradients, color intensities, and/or color saturations based on the features within the sensitive data). For example, the first set of image representations may include a first image representation for a first sensitive data instance for the set of sensitive data instances, wherein the first image representation is based on a first mapping template, and wherein the first mapping template maps a first set of alphanumeric characters in the first sensitive data instance to a first set of color coding. The first set of image representations may include a second image representation for a second sensitive data instance for the set of sensitive data instances, wherein the second image representation is based on the first mapping template or a second mapping template, wherein the second mapping template maps a second set of alphanumeric characters in the second sensitive data instance to a second set of color coding. For example, the system may retrieve, through a user database, a set of image representations that use particular colors in defined positions of the images to represent corresponding sensitive data. In some embodiments, the first and second mapping templates may be interchangeable or identical. Alternatively or additionally, the first and second mapping templates may differ, such as based on time, location, or the nature of the data instance. Because the image representations may not be in a human-readable format, the representations may enable processing of information and/or data based on patterns in the images, while protecting the underlying data from being read. By doing so, the system enables receipt of useful information, even if such information is based on underlying data that is secure or confidential and, as such, may not be allowed to be received at the system directly.

At operation 108, the system may gather multiple image representations of sensitive data instances that may vary geographically or system-wide. For example, the system may gather image representations generated by the determined mapping template and/or a different mapping template, where the image representations are associated with other users of a user database (e.g., a health information system). As an illustrative example, the system may utilize the mapping template to generate a color coding corresponding to components or characters of given data instances.

At operation 110, the system may apply unsupervised learning algorithms in order to cluster exactly duplicated, similar or nearly similar data instances (e.g., records). For example, the system may determine whether any data instances are likely to correspond to the same user based on clustering techniques. For example, the system may cluster (e.g., via unsupervised learning) image representations generated from different instances of sensitive data to determine a subset of sensitive data likely to be the same.

At operation 112, the system may identify similar images based on the clustering mechanism in order to enable deduplication of user records. For example, the system may determine record identifiers (e.g., identifiers of data instances deemed to be similar or nearly similar) and transmit these to a system that enables deduplication and/or marking of the corresponding data instances as duplicates. For example, the system may retrieve the image representations along with record identifiers identifying the instance of sensitive data to which the image representation corresponds, which may be decoded and/or used for further data analytics. In disclosed embodiments, the system may cluster the first sensitive data instance and the second sensitive data instance into a first cluster based on similarities between the first image representation and the second image representation. As an illustrative example, the system may generate clusters based on an affinity propagation algorithm after generating vector encodings of image representations of data instances. By doing so, the system may determine whether any image representations and, thus, whether any data instances are similar or nearly similar. By generating such clustering, the system may deduce information that may aid in data analytics tasks, such as deduplication. De-duplication may be carried out in circumstances where data instances (e.g., which record identifiers) are associated with similar data.

For example, the system may perform a first data analytics operation on the first cluster. In disclosed embodiments, the system may utilize the clusters determined previously in order to determine a likelihood that given data instances correspond to duplicated data. By doing so, the system may accurately and efficiently identify duplicate entries within sensitive or confidential data, without having access to the data itself. As such, the system disclosed herein enables processing of data from various sources through processing and clustering of corresponding image representations, even if such data may not be allowed to be directly communicated to the system.

By enabling data processing tasks to be performed on sensitive or confidential information, the system confers various benefits. For example, by generating clusters of information, the system may handle data instances or records that are not identical but are still likely to correspond to the same user or entity. Due to use of the mapping template and the resulting image representations of sensitive data, the system maintains data in a manner that does not easily enable decoding, thereby mitigating tampering or theft of sensitive information during processing. Furthermore, the mapping template itself may be varied over time or across data processing tasks (e.g., each data processing session), thereby mitigating brute force-based decoding tactics. Additionally or alternatively, the system may not require third-party deduplication software or systems.

In disclosed embodiments, the system may not utilize encryption. Encryption, such as through the use of hashing algorithms, can lead to data loss and may not enable accurate data processing following hashing or encryption. For example, similar data may exhibit significantly different hashes, while differing data may lead to the same hash. By utilizing a mapping template, as disclosed herein, the system enables data operations to be performed even after mapping, thereby improving the usefulness of the processed data.

In some embodiments, the system enables comparison and simultaneous processing of data that may not legally be held on the same system. For example, the system enables PII or other sensitive information in the form of image representations, protecting the information while still enabling storage and/or handling of the information across geographic regions (e.g., in servers or on cloud storage). Furthermore, the mapping templates may be difficult to recover following generation of the image representations due to the volume of color images that may be produced, thereby discouraging attempts of theft or decoding of the sensitive information.

In some embodiments, as discussed below, the mapping template may leverage color gradient, intensity, hue, saturation, and/or temperature to improve the complexity of the image representations of the sensitive data, thereby improving data security. The system may operate on shorter lengths of text data, and/or longer lengths of text data.

FIGS. 2A-C show illustrative depictions of data instances and corresponding image representations, as well as clusters of image representations, in accordance with one or more embodiments. For example, FIG. 2A depicts illustrative sensitive dataset 200, including one or more sensitive data instances 212-216. FIG. 2B depicts schematic 220 for image representations 222-226 of various data records (e.g., sensitive data instances). FIG. 2C depicts clusters 240 of image representations corresponding to data records associated with (e.g., duplicated from) data instances 212-216. By converting sensitive data into corresponding image representations, the system enables clustering of data into clusters 240 for data deduplication and processing without direct access to or visibility of data within data instances 212-216, thereby protecting their security and privacy. For example, as shown in FIG. 2C, the system may identify clusters of image representations corresponding to similar data, without divulging any underlying sensitive information.

In disclosed embodiments, the system may handle data instances. Data instances may include any information or data, such as data corresponding to a particular entity, a particular record or a particular entry of data. For example, a data instance may include one or more features (e.g., fields) corresponding to an entry of data. In some embodiments, a data instance may include information relating to a user of a system. For example, a data instance may include one of data instances 212-214, and may include features such as record identifier 202, given name 204, surname 206, postal address 208, and/or telephone number 210. As such, a sensitive data instance may include PII or other private information that is legally or ethically protected from unauthorized access, or otherwise sensitive. For example, a sensitive data instance may include health information relating to one or more users of a health system. Alternatively or additionally, a sensitive data instance may include information relating to customers or users of a credit card account, bank account, or a financial organization, including account numbers, birthdates, and/or identification numbers. Because such information can be used for illicit or fraudulent purposes, such information may be protected legally and, as such, may not be able to be processed outside of specified geographic regions and/or computer systems, for example.

In disclosed embodiments, data instances may include one or more features. Features may include portions of data instances that may be meaningful. For example, features may include fields within data instances, wherein each field separates a data instance into meaningful units. A field may include given name 204, surname 206, and/or postal address 208. The system may extract a set of fields (e.g., a set of features) from a data instance depending on a desired data analytics operation. For example, the system may extract given names 204 and surnames 206 from data instances 212-216 to execute a name deduplication task. By doing so, the system enables flexibility and improved accuracy in data analytics operations based on selection of data to be considered and/or processed.

In disclosed embodiments, the data instances and/or features may include alphanumeric characters, including text. For example, alphanumeric characters may include any of thirty-six characters including English letters and digits (e.g., digits from zero to nine). In some embodiments, the system may preprocess alphanumeric characters within data instances and/or features by removing special characters. For example, a special character may include any non-alphanumeric characters, including modified alphanumeric characters (e.g., characters with diacritics), such as characters found in non-English foreign languages, such as Spanish or French. Special characters may include characters unassociated with other alphabetic or numeric characters, such as the hash character, percentage sign, or types of hyphens. Additionally or alternatively, the system may not eliminate non-alphanumeric characters and/or special characters (e.g., hyphenated surnames may be retained). In some embodiments, the system may convert special characters (e.g., the character "e") to an alphanumeric character (e.g., the character "e"). In some embodiments, data instances may include characters, words, phrases, and/or sentences in other languages other than English. For example, in these cases, alphanumeric characters may include characters in any alphabet, writing system, or script corresponding to any language. By extracting features that include alphanumeric characters, including text, the system may simplify data analytics operations for commonly duplicated information, such as deduplication of special characters (e.g., in situations where the name "Léo" is commonly written as "Leo," as in passports of identification documents where diacritics are not allowed).

In disclosed embodiments, data instances may include instance identifiers. Instance identifiers may include identifiers of data instances, such as data record identifiers (e.g., record identifiers 202, as shown in FIG. 2A). For example, an instance identifier may include a numeric or alphanumeric token that may serve as a unique identifier of a given data record. By associating data instances with identifiers, the system enables decoding of transformations or representations of data instances using such identifiers. For example, because data instance identifiers may not include PII or other sensitive information, such identifiers may be shared without the same limitations as PII, thereby enabling post-processing of data by privileged users based on identifiers flagged by the system.

In disclosed embodiments, sensitive data instances may be associated with privilege and/or privileged users. Privilege may include authorization of a user or an entity to access information, such as information associated with sensitive data instances. For example, privilege may include a legal rule (e.g., a right) that protects communications or other information within certain relationships (e.g., organizations, systems or services) from disclosure to other parties. In some cases, privilege may be based on geographic location. For example, system-related information may be available only to certain entities within a particular geographic region associated with the system. Because of the complexities associated with privilege, certain data operations with raw data (e.g., deduplication of sensitive data instances themselves that are stored across geographically diverse systems) may be legally, ethically or otherwise discouraged. As such, the system may process data (e.g., enable execution of data analytics operations) based on whether an entity or a user is privileged.

In disclosed embodiments, the system may generate an image representation (e.g., of data instances). An image representation may include a representation of a data instance in the form of a digital image. For example, an image representation may include a digital image of colors that represent a data instance. For example, in some embodiments, an image representation may include a mapping of each character within one or more features associated with a data instance to a region of space within the corresponding digital image. As an illustrative example, the system may generate an image representation of a data instance whereby each field or feature of the data instance is represented as a larger fixed width region within the digital image. Within each fixed width region, the system may represent each alphanumeric character within a given feature as a smaller fixed width region, within the larger fixed width representing the feature. Each character may be mapped to a color, color gradient, color intensity, color hue, color saturation, color temperature, or any other attribute of regions of a digital image based on a mapping template. By generating image representations of information within data instances, the system preserves information within data instances to enable complex data analytics operations, such as deduplication, while precluding decoding by humans or computers without possession of the corresponding mapping template.

In disclosed embodiments, the system may generate image representations using mapping templates (e.g., color palettes). A mapping template may include an algorithm, ruleset, or mapping between data or data instances and image representations. For example, a mapping template may specify the generation of a region (e.g., of a particular size) of a particular color for each alphanumeric character within a given feature of a data instance. A mapping template may be encrypted (e.g., using symmetric or asymmetric encryption) in order to prevent malicious entities from decoding image representations of sensitive data instances. In some embodiments, a mapping template may specify rules in a manner that represents a full feature, rather than each character within a feature.

In disclosed embodiments, mapping templates may enable color coding of data instances (e.g., of features within data instances). A color coding may include any encoding ruleset or mechanism for encoding data into image representations that includes color-related rules or factors. For example, for a data instance that includes a "birthday" feature, a mapping template may specify a single color for the date, where a combination of color-related factors determine the full date (e.g., a color temperature specifies the year, while a hue specifies the month, and a color saturation specifies the day). In some embodiments, the system may utilize the same mapping template for multiple data instances. Alternatively or additionally, the system may utilize different mapping templates for different data instances (e.g., for a different run of the algorithm, or based on a timestamp or identifier of the data instance). By specifying the mapping template, the system enables the system to process sensitive data without directly utilizing such sensitive data (e.g., based on reading the mapping template associated with regions of a digital image). Furthermore, cycling or iterating through such mapping templates prevents malicious entities from decoding the mapping template.

In disclosed embodiments, color may include a characteristic of visual perception of a portion of an image, described using color categories (e.g., red, orange, yellow, green, blue or purple). For example, a color may include a range of wavelengths visible to the human eye. In some embodiments, color may include wavelengths detectable or encoded via computing devices that may not be visible to the human eye, such as images that encode ultraviolet and/or infrared frequencies. As an illustrative example, color may be encoded on positions within a digital image using additive color mixing (e.g., red-green-blue (RGB)) schemes, subtractive color mixing (cyan-magenta-yellow (CMYK)) schemes, and/or uniform color spaces (e.g., with three dimensions or coordinates). By utilizing color and color-related encodings, the system may generate non-human-readable versions of sensitive data instances, thereby enabling processing and communication of such data while mitigating the risk of sensitive data being breached.

In disclosed embodiments, the system may utilize color gradient for encoding data. Color gradients may include a range of position-dependent colors (e.g., the color may change as a function of position within an image). For example, features or characters associated with a textual data instance may be encoded through color gradients on defined positions or points within the corresponding image representation. In disclosed embodiments, the system may utilize color intensity for encoding data into resulting image representations. Color intensity may include a measure, quantitative or qualitative, of a brightness and/or dullness of an image. In some embodiments, color intensity may include an indication of the physical intensity of light, such as an intensity of light emitted from a screen. Additionally or alternatively, color intensity may include a subjective measure of a purity or brightness of a color.

In disclosed embodiments, the system may utilize hues for mapping data to image representations. Hues may include a measure of a dominant wavelength of a color. For example, a portion of an image that appears reddish-brown may be described by a hue of "red." In some embodiments, a hue may include a quantitative measure of a degree to which the hue represents the corresponding color of the portion of the image. For example, the reddish-brown portion of the image may correspond with a designation as a percentage of a color (e.g., 45% red), as the portion may not be fully red. In some embodiments, the mapping template may specify a hue as a Munsell value (e.g., as fitting within one of five principal hues).

In disclosed embodiments, the system may utilize color saturation for encoding data instances into image representations. Color saturation may include a degree of color intensity or chromaticity as judged in proportion to its brightness or whitishness. For example, a saturated image may include a measure of the colorfulness of an area within an image representation judged in proportion to its brightness. For example, the mapping template may specify a color saturation of a particular alphanumeric character or feature based on the color's intensity and how much of the color is distributed across the rest of the image. In disclosed embodiments, the system may utilize color temperature for encoding data instances into image representations. For example, color temperature may include a measure of the color of an idealized opaque, non-reflective body at a particular temperature measured in Kelvin or on a different temperature scale. For example, color temperature may include a measure of the electromagnetic radiation emitted from an ideal black body defined by its surface temperature. In some embodiments, a mapping template may specify any one of these factors or a combination of such factors for mapping of data instances to corresponding image representations. By generating image representations of data instances based on factors such as color gradients, hues, saturation, and/or temperature within a mapping template, the system may improve the complexity of encoding sensitive data, thereby mitigating security breaches upon communication and processing of this information.

FIG. 3 shows an illustrative algorithm for performing data analytics on sensitive data, in accordance with one or more embodiments. For example, the system may utilize algorithm 300 to generate input 302 or output 304. The system may include preprocess function 306, encode function 308, decode function 310, and/or a main function 312.

For example, at main function 312, the system may load input 302 (e.g., variable a), which may correspond to data (e.g., sensitive data instances) corresponding to a user database. Such data may include duplicate entries that may be deduplicated. The system may preprocess input 302 using preprocess function 306 by, for example, modifying the case of textual data within input 302, and/or eliminating special characters. In some embodiments, the system may compare words, features, or characters within input 302 with keyword within a keyword database. Keywords within the keyword database may include forms of words that may be shortened (e.g., common nicknames), which may be replaced by corresponding full-form words or features. Additionally or alternatively, the system may replace full-form words or features with corresponding short-form words or features based on the keyword database. Main function 312 may utilize results of preprocess function 306 for further processing.

For example, at main function 312, the system may utilize encode function 308 to load the input and a mapping template, which may include a color palette. Each character within input 302 may be encoded based on the mapping template (e.g., into corresponding colors) and compressed as image files. Main function 312 may aggregate various such image encodings (e.g., various image representations of sensitive data instances generated on different systems in different locations) and process the encodings using an unsupervised learning algorithm for clustering (e.g., an affinity propagation algorithm). For example, hyperparameters of the unsupervised learning algorithm may be tuned and implemented for analysis across image representations. Based on clusters generated by the unsupervised learning algorithm, the system may provide indications of data likely to be similar (e.g., within the same cluster) and decode such information utilizing decode function 310. As such, the system enables retrieval of sensitive data instances (e.g., records) based on the corresponding image representations (e.g., by a privileged user).

FIG. 4 shows an illustrative data structure demonstrating variations of features within data instances, in accordance with one or more embodiments. For example, data structure 400 illustrates terms 402 that may include possible (e.g., common) variations 404 within databases.

For example, user databases may include variations of names to refer to the same person. As an illustrative example, a suffix such as "Junior" may have several variations, such as "Jr.," "Jr" or "JR." User records may include duplicate entries based on differing names, such as "William" and "Bill" or "Vignesh" and "Vicky." In some cases, names may be abbreviated in some data. For example, in some cases, names may be shortened from "Lourdu Chinnappa Rajan" to "L. C. Rajan" within some records, leading to duplication of records if a full name is provided within another record. In some embodiments, features of data instances relating to addresses may include street types (e.g., a user database may include duplicate entries with "Street" and "St."), and/or directions (e.g., duplicate entries W for West). The system enables such deduplication of duplicate entries with common variations even in the case of sensitive personal information within user databases distributed across systems (where, legally, bulk processing of such data and, therefore, conventional deduplication using raw data may not be possible).

FIGS. 5A-B show illustrative data structures demonstrating the effectiveness of clustering techniques for performing data analytics (e.g., deduplication) on sensitive data, in accordance with one or more embodiments. For example, performance regarding the system was tested for various datasets. For example, internally-created datasets were scaled from between one thousand and ten thousand records (e.g., data instances). For datasets of one thousand records (e.g., individual data instances), information relating to system performance is provided in FIG. 5A and FIG. 5B. For example, clusters of similar data instances were compared with "ground-truth" clusters in order to determine the accuracy of deduplication tasks.

For example, data structure 500 depicted in FIG. 5A includes accuracy calculated with data instances with more than 95% of duplicated data (e.g., column 506) with three features (e.g., column 510) or six features (e.g., column 512) based on various algorithms 504 relating to clustering techniques (as shown in section 508) or hashing techniques (as shown in section 514). Regardless of the number of features within data instances (e.g., extracted from client profile details) that are considered, system accuracy for the determination of duplicate data entries is generally stable (e.g., above eighty percent for k-means or affinity propagation clustering techniques, with less accuracy for other clustering or hash techniques). Because k-means clustering may require knowledge of a number of clusters (e.g., a number of unique users corresponding to data instances) within a dataset, affinity propagation may offer improved flexibility as a clustering algorithm.

Data structure 520 depicts the impact of the percentage of data that exhibits duplicate entries on the accuracy of the system. For example, accuracy as a function of percentage of duplicated data and algorithms 524 is presented. Column 526 depicts accuracy results (with consideration of three features or six features respectively) for 95% duplicated data, while column 528 depicts accuracy results for 90% duplicated data and column 530 depicts accuracy results for 80% duplicated data. As shown, accuracy is improved for higher duplication rates within a dataset due to the generation of noise associated with detecting unique tuples within the dataset.

In disclosed embodiments, the system may perform data analytics operations based on image representations of data instances. A data analytics operation may include an operation that processes, analyzes, transforms, retrieves, rearranges, prints, or updates information or data. For example, a data analytics operation may include identifying data that is similar or nearly similar. The system may cluster (e.g., identify similarities between) data instances based on similarities within their corresponding image representations. Additionally or alternatively, the system may perform other operations relating to the data instances, such as sort data instances based on a particular feature (e.g., based on sorting image representations based on feature-specific hues or color intensities), and/or calculate averages (e.g., based on calculating an average color of a set of image representations). Because such data analytics operations may be performed on data without disclosure of the underlying information in a human-readable manner, the system disclosed herein enables processing of bulk sensitive data in situations where such processing may be legally restricted (e.g., in the case of differing geographic restrictions on the shareability of data).

In disclosed embodiments, the system may determine one or more clusters associated with the image representations. Clustering may include techniques to group similar data points together. For example, a cluster may include a group of image representations determined to be similar to within a threshold value on the basis of distance metrics. The system may generate clusters of image representations of sensitive data instances based on the similarity of such image representations through image processing. Cluster size may include an indication of the number of data instances or image representations determined to be in a given cluster. Alternatively or additionally, cluster size may include an indication of the number of clusters that may be formed from a given set of image representations. In some embodiments, the system may generate a cluster based on a required cluster percentage, which may include an indication of a minimum amount or fraction of similarities between two or more image representations before the system classifies the data into a cluster. Additionally or alternatively, the system may utilize k-means clustering, affinity propagation, and/or ordering points to identify the clustering structure to generate determinations of similar image representations. In some embodiments, the system may generate vector representations of image representations prior to generating clusters. By generating clusters, the system enables detection of possible duplicates within a given dataset, as duplicate data may be significantly more similar than other data. As such, clusters may be more likely to include variations of data pertaining to the same entity, thereby enabling identification and mitigation of duplicates within sets of sensitive data.

In disclosed embodiments, the system may determine clusters based on k-means clustering. The k-means clustering method may include methods of unsupervised learning that work by partitioning n observations (e.g., data instances and/or image representations) into k clusters, where each observation belongs to the cluster with the nearest mean. For example, the system may generate vector representations of image representations corresponding to sensitive data instances. Based on the vector representations, the system may utilize k-means clustering to determine data that is similar based on distances of the vector representations of the images from each other and a corresponding centroid of the cluster. For example, a distance may include a representation of the virtual distance between two vector representations within a vector space. A centroid may include a data point (e.g., imaginary or real) associated with a mean (e.g., average) position of all vector representations within a given cluster. A k-means algorithm may assign image representations (e.g., generate assignments) to clusters based on how close, distance-wise, a given image representation is from a centroid corresponding to a given cluster. By doing so, a k-means algorithm enables grouping of similar data, thereby enabling the system to identify possible duplicates within the sensitive data based on non-human-readable image representations of such data.

In disclosed embodiments, the system may determine clusters based on affinity propagation. Affinity propagation may include methods of unsupervised learning based on virtual message passing between data points. For example, affinity propagation may include updating responsibility and availability matrices based on sending virtual messages between all pairs of image representations (e.g., data points) through calculation of similarity matrices. The system may calculate exemplars for each cluster based on the responsibility and availability matrices until convergence. Because affinity propagation may enable clustering of data points without knowledge of the number of clusters to be determined, the system may leverage affinity propagation in situations where the number of duplicates within a given dataset is unknown.

In disclosed embodiments, the similarity matrix may include a square matrix that includes information relating to pairwise similarities between all data points, such as between image representations of sensitive data instances. For example, elements within the diagonal of the self-similarity matrix may include information relating to the self-similarities of each data point. For example, the similarity matrix may be calculated using Euclidean distance between vector representations of corresponding image representations, cosine similarity, or a Pearson correlation coefficient (e.g., r-value).

In disclosed embodiments, the system may determine exemplars. An exemplar may include a data point (e.g., an image representation or a data instance) determined to be representative of a cluster. For example, an exemplar may be chosen based on similarity to other data points in a cluster.

In disclosed embodiments, the system may determine and/or calculate responsibility matrices. A responsibility matrix may include a square matrix where each element represents a measure of the extent to which the image representation may be an appropriate exemplar for another image representation. For example, a corresponding element of the responsibility matrix may represent the responsibility of a first image representation to have a second image representation as an exemplar. In disclosed embodiments, the system may determine and/or calculate availability matrices. An availability matrix may include a square matrix where each element represents a measure of the extent to which the image representation may choose another image representation as an exemplar. For example, a corresponding element of the responsibility matrix may represent the availability of a first image representation to act as an exemplar to a corresponding second test image representation. By calculating similarity, responsibility and availability matrices, the system enables classification of images corresponding to sensitive data into clusters, thereby enabling deduplication without the need to access such sensitive data directly.

In disclosed embodiments, the system may determine clusters based on ordering points to identify the clustering structure (OPTICS). OPTICS may include a density-based clustering mechanism that enables extraction of varying densities and shapes. For example, OPTICS clustering may include generating distances between vector representations of image representations of data and generating an ordered list of points based on these distances. By doing so, the system enables identification of clusters based on regions of vector space with a higher density of vector representations than other regions. In disclosed embodiments, the system may determine and/or calculate density threshold parameters, which may include a value that controls a minimum density of clusters. For example, the density threshold parameter may determine a minimum number of points within a certain distance of a given point for the point to be considered a core point (and, therefore, to define a cluster). The system may determine the density threshold parameter based on a point of maximum curvature based on a list of points or a list of distances. In some embodiments, the density threshold parameter may be determined by default or by a user, in order to improve the accuracy of clustering operations. By utilizing these methods and parameters, OPTICS enables classification of data into clusters without prior knowledge of the number of clusters, thereby aiding in deduplication tasks.

FIG. 6 shows an illustrative architecture for a system that performs data analytics on sensitive data, in accordance with one or more embodiments. For example, architecture 600 may include initial phase 602, algorithm phase 604, hidden phase 622, and/or decoding phase 624.

For example, architecture 600 illustrates initial phase 602, where a privileged user (e.g., a user with access to one or more sensitive data instances) may determine a mapping template (e.g., a way to encode data). In some embodiments, the mapping template (e.g., a color palette) may be sent across geographic locations using one or more encryption techniques, such as asymmetric encryption or symmetric encryption. The mapping template may depend on time, geographic location, or each run of a data analytics operation, in order to mitigate the impacts of a brute force-style decoding security breach. By generating a mapping template and securely distributing the template to various locations, information stored on different media may be encoded in a similar manner, thereby enabling consistent encoding of user data.

Architecture 600 illustrates algorithm phase 604. For example, at algorithm phase 604, the system may execute preprocessing operations. At operation 606, the system may change the case of any textual data (e.g., convert all-uppercase letter text to mixed lowercase and uppercase, or to all lowercase text). At operation 608, the system may eliminate special characters within data instances, such as hash characters, stars, foreign characters (e.g., characters with diacritics), and/or other non-alphanumeric characters. At operation 610, the system may extract features associated with data instances, including various fields (e.g., a "name" field or an "address" field). At operation 612, the system may encode text into groups of images. For example, each image in the group of images may represent one or more features associated with sensitive data instances.

Architecture 600 illustrates hidden phase 614. For example, within hidden phase 614, sensitive data instances may not be directly visible to the system and/or users of the system and, as such, operations performed within hidden phase 622 may be performed without PII-related legal or security limitations. For example, at operation 616, the system may amalgamate representations of sensitive data instances from various geographic locations, systems or devices for further processing. At operation 618, data processing algorithms may be performed, including clustering algorithms (e.g., affinity propagation and/or unsupervised learning techniques). At operation 620, the system may generate clusters of image representations of sensitive data instances and, as such, determine image representations that are similar (and, therefore, corresponding data instances that are likely duplicated or similar).

Architecture 600 illustrates decoding phase 624. For example, at decoding phase 624, the system may associate clusters of images (e.g., similar images) with record identifiers and, as such, alert or transmit such information to a subsystem or entity with access to privileged and/or sensitive data. For example, at step 626, the system may associate any clustered images with record identifiers. At step 628, the system may decode images based on the record identifier and process the data based on any information generated in hidden phase 614. As such, the systems disclosed herein enable processing (e.g., deduplication) of data that may be stored in a privileged manner and, as such, cannot be explicitly processed in an unmodified form. By generating image representations corresponding to a color template (e.g., a mapping template), the system may process and/or identify data instances that may require further consideration by one or more privileged users.

FIG. 7A shows illustrative components for a system used to perform data analytics operations on sensitive data, in accordance with one or more embodiments. For example, FIG. 7A may show illustrative components for de-duplicating sensitive user information by generating image representations of sensitive data instances. As shown in FIG. 7A, system 700 may include mobile device 722 and mobile device 724. While shown as a smartphone, respectively, in FIG. 7A, it should be noted that mobile device 722 and mobile device 724 may be any computing device, including, but not limited to, a laptop computer, a tablet computer, a hand-held computer, and other computer equipment (e.g., a server), including "smart," wireless, wearable, and/or mobile devices. System 700 may also include cloud components. For example, cloud components may be implemented as a cloud computing system, and may feature one or more component devices. It should be noted, that, while one or more operations are described herein as being performed by particular components of system 700, these operations may, in some embodiments, be performed by other components of system 700. As an example, while one or more operations are described herein as being performed by components of mobile device 722, these operations may, in some embodiments, be performed by cloud components. In some embodiments, the various computers and systems described herein may include one or more computing devices that are programmed to perform the described functions. Additionally, or alternatively, multiple users may interact with system 700 and/or one or more components of system 700.

With respect to the components of mobile device 722 and mobile device 724, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 7A, both mobile device 722 and mobile device 724 include a display upon which to display data.

Additionally, as mobile device 722 and mobile device 724 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 700 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 7A also includes communication paths 728, 730, and 732. Communication paths 728, 730, and 732 may include the Internet, a mobile phone network, a mobile voice or data network (e.g., a 5G or LTE network), a cable network, a public switched telephone network, or other types of communications networks or combinations of communications networks. Communication paths 728, 730, and 732 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 700 also includes API layer 750. API layer 750 may allow the system to generate summaries across different devices. In some embodiments, API layer 750 may be implemented on a user device (e.g., mobile device 722) or a user terminal (e.g., mobile device 724). Alternatively or additionally, API layer 750 may reside on one or more of cloud components 710. API layer 750 (which may be A REST or Web services API layer) may provide a decoupled interface to data and/or functionality of one or more applications. API layer 750 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 750 may use various architectural arrangements. For example, system 700 may be partially based on API layer 750, such that there is strong adoption of SOAP and RESTful Web-services, using resources like Service Repository and Developer Portal, but with low governance, standardization, and separation of concerns. Alternatively, system 700 may be fully based on API layer 750, such that separation of concerns between layers like API layer 750, services, and applications are in place.

In some embodiments, the system architecture may use a microservice approach. Such systems may use two types of layers: Front-End Layer and Back-End Layer where microservices reside. In this kind of architecture, the role of the API layer 750 may provide integration between Front-End and Back-End. In such cases, API layer 750 may use RESTful APIs (exposition to front-end or even communication between microservices). API layer 750 may use AMQP (e.g., Kafka, RabbitMQ, etc.). API layer 750 may use incipient usage of new communications protocols such as gRPC, Thrift, etc.

In some embodiments, the system architecture may use an open API approach. In such cases, API layer 750 may use commercial or open source API Platforms and their modules. API layer 750 may use a developer portal. API layer 750 may use strong security constraints applying WAF and DDOS protection, and API layer 750 may use RESTful APIs as standard for external integration.

System 700 also includes model 702a, which may be a machine learning model, artificial intelligence model, etc. (which may be referred collectively as "models" herein). Model 702a may take inputs 704a and provide outputs 706a. The inputs may include multiple datasets, such as a training dataset and a test dataset. Each of the plurality of datasets (e.g., inputs 704a) may include data subsets related to user data, predicted forecasts and/or errors, and/or actual forecasts and/or errors. In some embodiments, outputs 706a may be fed back to model 702a as input to train model 702 (e.g., alone or in conjunction with user indications of the accuracy of outputs 706a, labels associated with the inputs, or with other reference feedback information). For example, the system may receive a first labeled feature input, wherein the first labeled feature input is labeled with a known prediction for the first labeled feature input. The system may then train the first machine learning model to cluster the first labeled feature input with the known prediction (e.g., whether image representations of data instances correspond to duplicate data).

In a variety of embodiments, model 702a may update its configurations (e.g., weights, biases, or other parameters) based on the assessment of its prediction (e.g., outputs 706a) and reference feedback information (e.g., user indication of accuracy, reference labels, or other information). In a variety of embodiments, where model 702a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 702a may be trained to generate better predictions.

In some embodiments, the model (e.g., model 702a) may automatically perform actions based on outputs 706. In some embodiments, the model (e.g., model 702a) may not perform any actions. The output of the model (e.g., model 702a) may be used to perform data analytics operations, such as deduplication of data determined to be similar or nearly similar.

As shown in FIG. 7B, in some embodiments, model 702b may be trained by taking inputs 704b and provide outputs 706b. Model 702b may include an artificial neural network. In such embodiments, model 702b may include an input layer and one or more hidden layers. Each neural unit of model 702b may be connected with many other neural units of model 702b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 702b may be self-learning and trained, rather than explicitly programmed, and can perform significantly better in certain areas of problem solving, as compared to traditional computer programs. During training, an output layer of model 702 may correspond to a classification of model 702b, and an input known to correspond to that classification may be input into an input layer of model 702b during training. During testing, an input without a known classification may be input into the input layer, and a determined classification may be output.

In some embodiments, model 702b may include multiple layers (e.g., where a signal path traverses from front layers to back layers). In some embodiments, back propagation techniques may be utilized by model 702b where forward stimulation is used to reset weights on the "front" neural units. In some embodiments, stimulation and inhibition for model 702 may be more free-flowing, with connections interacting in a more chaotic and complex fashion. During testing, an output layer of model 702b may indicate whether or not a given input corresponds to a classification of model 702b (e.g., whether a data point, such as an image representation, corresponds to a cluster of image representations).

Model 702b is shown as a convolutional neural network. A convolutional neural network consists of an input layer (e.g., input 704a), hidden layers, and an output layer (e.g., output 706b). As shown in FIG. 7B, the middle layers are called hidden because their inputs and outputs are masked by the activation function and final convolution. In a convolutional neural network, the hidden layers include layers that perform convolutions. Model 702b may comprise convolutional layers that convolve the input and pass its result to the next layer. Model 702b includes local and/or global pooling layers along with traditional convolutional layers. Pooling layers reduce the dimensions of data by combining the outputs of neuron clusters at one layer into a single neuron in the next layer. Also as shown, model 702b may comprise fully connected layers that connect every neuron in one layer to every neuron in another layer.

FIG. 8 shows a flowchart of the steps involved in performing data analytics on sensitive data in remote network environments without exposing content of the sensitive data, in accordance with one or more embodiments. For example, the system may use process 800 (e.g., as implemented on one or more system components described above) in order to de-duplicate user data based on similarities in image representations of features of the user data.

At step 802, process 800 (e.g., using one or more components described above) enables the system to receive a first request to perform a first data analytics operation for a set of sensitive data instances. For example, the system may receive a first request to perform a first data analytics operation for a set of sensitive data instances. In some embodiments, the system may receive a request from one or more users to determine the presence of duplicate data entries within a dataset of sensitive data, such as health or financial records. By doing so, the system may process requests for data analytics on demand, based on specifications or requirements received through a request from a user.

At step 804, process 800 (e.g., using one or more components described above) enables the system to retrieve a first set of image representations for the set of sensitive data instances. For example, the first set of image representations may include a first image representation for a first sensitive data instance for the set of sensitive data instances, wherein the first image representation is based on a first mapping template, and wherein the first mapping template maps a first set of alphanumeric characters in the first sensitive data instance to a first set of color coding. The first set of image representations may include a second image representation for a second sensitive data instance for the set of sensitive data instances, wherein the second image representation is based on the first mapping and/or a second mapping template, wherein the second mapping template maps a second set of alphanumeric characters in the second sensitive data instance to a second set of color coding. For example, the system may retrieve, through a user database, a set of image representations that use particular colors in defined positions of the images to represent corresponding sensitive data. In some embodiments, the first and second mapping templates may be interchangeable or identical. Alternatively or additionally, the first and second mapping templates may differ, such as based on time, location, or the nature of the data instance. Because the image representations may not be in a human-readable format, the representations may enable processing of information and/or data based on patterns in the images, while protecting the underlying data from being read. By doing so, the system enables receipt of useful information, even if such information is based on underlying data that is secure or confidential and, as such, may not be allowed to be received at the system directly.

In some embodiments, retrieving the first set of image representations for the set of sensitive data instances may include generating image representations of the data instances on different devices. For example, the first image representation may be generated at a first device in a network. The second image representation may be generated at a second device in the network. As an illustrative example, a user of an organization may apply for accounts at two different branches of the organization (e.g., at different branches of the same bank) in two different states. In some cases, the user may have utilized a nickname in generating the account details in one branch rather than the full name, leading to duplication of data corresponding to the user across the organization. While corresponding servers at the corresponding branches may possess the information separately, data sharing laws may preclude unencrypted transfer of such information externally from separate servers (e.g., devices) associated with the bank (e.g., outside of state boundaries). As such, the system enables handling and deduplication of these data instances by transforming the data into image representations, which may not be subject to the same limitations, while still enabling processing of the data without decryption. By doing so, the system enables sharing and processing of sensitive information without directly divulging any underlying data.

In some embodiments, the system may retrieve image representations based on data whose text may be modified. For example, retrieving the first set of image representations for the set of sensitive data instances may include retrieving first text corresponding to the first sensitive data instance and generating a modified first text by removing a special character from the first text, wherein the modified first text comprises the first set of alphanumeric characters. As an illustrative example, the system may replace (e.g., remove and add) a letter with a diacritic, such as the letter "é" in "Léo" with the letter "e" as in "Leo." By doing so, the system enables simplification of any duplicated data due to inconsistencies in text encoding between various systems.

In some embodiments, mapping templates may map alphanumeric characters to a color coding based on associating colors with alphanumeric characters. For example, the first mapping template may map the first set of alphanumeric characters in the first sensitive data instance to the first set of color coding by indicating a first color corresponding to a first alphanumeric character and by replacing the first alphanumeric character in the first set of alphanumeric characters with the first color to generate the first image representation. For example, the mapping template may specify that the letter "e" is to be represented by a region with a color corresponding to red. By doing so, the system enables text to be represented using colors in a non-human-readable manner, thereby enabling encoding of sensitive information in a secure manner, such that the information may be transmitted and processed more securely.

In some embodiments, mapping templates may map alphanumeric characters to a color coding based on associating color gradients with alphanumeric characters. For example, the first mapping template may map the first set of alphanumeric characters in the first sensitive data instance to the first set of color coding by indicating a first color gradient corresponding to a first alphanumeric character and by replacing the first alphanumeric character in the first set of alphanumeric characters with the first color gradient to generate the first image representation. As an illustrative example, the mapping template may specify that the letter "e" is to be represented with a region with a color gradient of a particular value. As an illustrative example, the color gradient may be specified quantitatively with respect to the image's color within an RGB scheme, such as by the specification of a partial derivative of a "red," "green" or "blue" value with respect to a dimension of the image. By encoding alphanumeric characters using color gradients, the system may generate image representations of data instances with improved complexity, thereby improving the security of the underlying sensitive data by mitigating the risk of decoding by a malicious entity.

In some embodiments, mapping templates may map alphanumeric characters to a color coding based on associating color hues with alphanumeric characters. For example, the first mapping template may map the first set of alphanumeric characters in the first sensitive data instance to the first set of color coding by indicating a first color hue corresponding to a first alphanumeric character and by replacing the first alphanumeric character in the first set of alphanumeric characters with the first color hue to generate the first image representation. As an illustrative example, the system may associate the letter "e" with a particular value of a Munsell hue (e.g., the hue corresponding to "5 YR"). By encoding alphanumeric characters using hues, the system may improve the complexity of mapping of sensitive data, such as health or personal identifiable data, to corresponding images, thereby improving the security of the information if communicated to other devices or geographic regions.

In some embodiments, mapping templates may map alphanumeric characters to a color coding based on associating color saturations with alphanumeric characters. For example, the first mapping template maps the first set of alphanumeric characters in the first sensitive data instance to the first set of color coding by indicating a first color saturation corresponding to a first alphanumeric character and by replacing the first alphanumeric character in the first set of alphanumeric characters with the first color saturation to generate the first image representation. As an illustrative example, the system may associate the letter "e" with a particular value of a saturation (e.g., a percentage on a scale ranging from pure color at 100% to grey at 0%). In some embodiments, the system may utilize combinations of any of the factors discussed herein, such as a combination between a color and a saturation value, in order to determine a mapping of alphanumeric characters to a corresponding color coding. By doing so, the system may further improve the security of communicated information by making decoding of the color coding more difficult.

In some embodiments, mapping templates may map alphanumeric characters to color coding based on associating color temperatures with alphanumeric characters. For example, the first mapping template may map the first set of alphanumeric characters in the first sensitive data instance to the first set of color coding by indicating a first color temperature corresponding to a first alphanumeric character and by replacing the first alphanumeric character in the first set of alphanumeric characters with the first color temperature to generate the first image representation. As an illustrative example, the system may associate the letter "e" with a color temperature of 4000 K (e.g., an orangish-cream color). By doing so, the system may quantify the mapping template in a manner that enables consistent, one-to-one mapping between alphanumeric characters and a corresponding color coding, enabling self-consistent encoding of sensitive data into corresponding image representations.

At step 806, process 800 (e.g., using one or more components described above) enables the system to cluster the first sensitive data instance and the second sensitive data instance into a first cluster. In disclosed embodiments, the system may cluster the first sensitive data instance and the second sensitive data instance into a first cluster based on similarities between the first image representation and the second image representation. As an illustrative example, the system may generate clusters based on a k-means algorithm after generating vector encodings of image representations of data instances. By doing so, the system may determine whether any image representations and, thus, whether any data instances are similar or nearly similar. By generating such classifications, the system may deduce information that may aid in data analytics tasks, such as deduplication, such as which data instances (e.g., which record identifiers) are associated with similar data.

In some embodiments, the system may utilize a k-means clustering algorithm for generation of the first cluster. For example, clustering the first sensitive data instance and the second sensitive data instance into the first cluster based on similarities between the first image representation and the second image representation may include generating a set of centroids, wherein each centroid indicates a position in a distribution space representing image representations of sensitive data instances. The system may determine a plurality of distances, wherein each distance of the plurality of distances indicates a corresponding distance between a corresponding position of a corresponding image representation and each centroid of the set of centroids. Based on determining the plurality of distances, the system may generate a first set of assignments for the set of sensitive data instances, wherein each assignment of the first set of assignments assigns an associated image representation of the first set of image representations to an associated cluster of a set of clusters. The system may update iteratively, based on the first set of assignments, the set of centroids based on generating a plurality of mean positions, wherein each mean position of the plurality of mean positions indicates a mean position of image representations associated with a given cluster of the set of clusters. As an illustrative example, the system may cluster user data based on k-means clustering if the number of duplicate entries is already known (e.g., if a number of users associated with the system is known such that the number of clusters generated may be known). As such, k-means clustering enables accurate, efficient determination of similar sensitive data instances based on prior knowledge of the nature of the data to be processed.

In some embodiments, the system may utilize affinity propagation for generation of the first cluster. For example, the system may generate a similarity matrix, wherein a corresponding element of the similarity matrix represents similarity between a corresponding first test image representation and a corresponding second test image representation, and wherein the first set of image representations comprises the corresponding first test image representation and the corresponding second test image representation. The system may update a responsibility matrix iteratively, wherein a corresponding element of the responsibility matrix represents responsibility of the corresponding first test image representation to exhibit the corresponding second test image representation as a corresponding exemplar. The system may update an availability matrix iteratively, wherein a corresponding element of the availability matrix represents availability of the corresponding first test image representation to act as an exemplar to the corresponding second test image representation. Based on the responsibility matrix and the availability matrix, the system may generate a set of assignments, wherein each assignment of the set of assignments links an associated image representation of the first set of image representations with a corresponding exemplar image representation of the first set of image representations. For example, in situations where the system may not know the number of duplicate entries within a sensitive dataset, the system may utilize affinity propagation to generate clusters based on the idea of "message passing." As demonstrated in FIGS. 5A and 5B, affinity propagation may be an efficient way to identify duplicate data within datasets with sensitive data, thereby demonstrating the improved accuracy of data analytics operations based on clustering.

In some embodiments, the system may utilize OPTICS for the generation of the first cluster. For example, the system may determine a list of distances, wherein each distance in the list of distances characterizes a distance between a first test image representation and a second test image representation, wherein the list of distances is sorted by distance, and wherein the first set of image representations comprises the first test image representation and the second test image representation. The system may determine, based on the list of distances, a density threshold parameter, wherein the density threshold parameter indicates a point of maximum curvature corresponding to a distance within the list of distances. The system may determine, based on the list of distances and the density threshold parameter, a set of clusters, wherein each cluster of the set of clusters comprises a corresponding plurality of image representations of the first set of image representations. Moreover, OPTICS may not require information relating to the number of expected clusters (e.g., the number of duplicate entries) in the system. OPTICS may also be beneficial due to the ability to set a density threshold parameter manually to improve efficiency. By doing so, the system enables more accurate and/or more efficient clustering to be executed on the image representations of the sensitive data.

In some embodiments, the system may determine a required cluster size for determination of the first cluster. For example, the system may determine a required cluster size for the first cluster and determine whether the first cluster corresponds to the required cluster size. As an illustrative example, the system may only determine that deduplication tasks may be necessary if there are enough entries requiring deduplication for a given cluster. By doing so, the system may prioritize situations where many entries were found to be duplicated, thereby improving system efficiency.

In some embodiments, the system may determine a required cluster percentage for determination of the first cluster. For example, the system may determine a required cluster percentage for the set of sensitive data instances and determine a minimum amount of similarities required to cluster the first image representation and the second image representation into the first cluster based on the required cluster percentage. For example, the system may determine that multiple image representations of data instances differ from each other by less than a threshold amount, and therefore that they are mostly similar (e.g., possess 90% of the same color coding). By making such a determination, the system may group such data together in order to indicate that it may be likely that the corresponding data is duplicated. By doing so, the system enables generation of clusters in a resource-efficient manner, thereby simplifying the processing of image representations to determine the existence of duplicate sensitive data instances.

At step 808, process 800 (e.g., using one or more components described above) enables the system to perform one or more data analytics operations. For example, the system may perform the first data analytics operation on the first cluster. In disclosed embodiments, the system may utilize the clusters determined previously in order to determine a likelihood that given data instances correspond to duplicated data. By doing so, the system may accurately and efficiently identify duplicate entries within sensitive or confidential data, without access to the data itself. As such, the system disclosed herein enables processing of data from various sources through processing and clustering of corresponding image representations, even if such data may not be allowed to be directly communicated to the system.

In some embodiments, the system may identify clustered data instances as potential duplicates based on their corresponding instance identifiers. For example, the system may retrieve a first instance identifier for the first sensitive data instance. The system may retrieve a second instance identifier for the second sensitive data instance. The system may label the first instance identifier and the second instance identifier as corresponding to a duplicate. For example, the system may determine that the first sensitive data instance and the second sensitive data instance are likely duplicates based on their inclusion in the first cluster. The system may retrieve corresponding record identifiers (e.g., numeric tags that uniquely identify the data). By doing so, the system may identify and label such data for further processing, deduplication, or review.

In some embodiments, the system may transmit sensitive data to a user after confirming the user's privilege. For example, the system may determine a privilege required to access the first sensitive data instance and the second sensitive data instance. The system may determine a user with the privilege. The system may transmit the first sensitive data instance and the second sensitive data instance to the user. In some embodiments, the system may transmit encodings of the first sensitive data instance and the second sensitive data instance to the user across regions for generation of encoded images and subsequent deduplication. For example, the system may determine a requirement for a user to have access to the sensitive information underlying the corresponding image representations. Based on confirming that a given user possesses such privilege (e.g., complies with any requirements), the system may transmit the sensitive data to the user, thereby enabling the user to perform deduplication tasks or any other processing tasks using the original, raw data. By doing so, the system ensures that data is protected from unauthorized users, while providing access to any authorized users.

It is contemplated that the steps or descriptions of FIG. 8 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a first request to perform a first data analytics operation for a set of sensitive data instances, wherein the first data analytics operation enables deduplication of data instances; retrieving a first set of image representations for the set of sensitive data instances, wherein the first set of image representations comprises: a first image representation for a first sensitive data instance for the set of sensitive data instances, wherein the first image representation is based on a first mapping template, wherein the first mapping template maps a first set of alphanumeric characters in the first sensitive data instance to a first set of color coding, and wherein the first set of color coding enables representation of the first sensitive data instance using color gradient, color intensity and hue; and a second image representation for a second sensitive data instance for the set of sensitive data instances, wherein the second image representation is based on the first mapping template; clustering the first sensitive data instance and the second sensitive data instance into a first cluster based on similarities between the first image representation and the second image representation; retrieving a first instance identifier for the first sensitive data instance and a second instance identifier for the second sensitive data instance; and labeling the first instance identifier and the second instance identifier as corresponding to a duplicate.

2. A method, the method comprising: receiving a first request to perform a first data analytics operation for a set of sensitive data instances; retrieving a first set of image representations for the set of sensitive data instances, wherein the first set of image representations comprises: a first image representation for a first sensitive data instance for the set of sensitive data instances, wherein the first image representation is based on a first mapping template, and wherein the first mapping template maps a first set of alphanumeric characters in the first sensitive data instance to a first set of color coding; and a second image representation for a second sensitive data instance for the set of sensitive data instances, wherein the second image representation is based on the first mapping and/or a second mapping a second mapping template, wherein the second mapping template maps a second set of alphanumeric characters in the second sensitive data instance to a second set of color coding; clustering the first sensitive data instance and the second sensitive data instance into a first cluster based on similarities between the first image representation and the second image representation; and performing the first data analytics operation on the first cluster.
3. The method of any one of the preceding embodiments, wherein retrieving the first set of image representations for the set of sensitive data instances further comprises: generating the first image representation at a first device in a network; and generating the second image representation at a second device in the network.
4. The method of any one of the preceding embodiments, wherein performing the first data analytics operation on the first cluster further comprises: retrieving a first instance identifier for the first sensitive data instance; retrieving a second instance identifier for the second sensitive data instance; and labeling the first instance identifier and the second instance identifier as corresponding to a duplicate.
5. The method of any one of the preceding embodiments, wherein performing the first data analytics operation on the first cluster further comprises: determining a privilege required to access the first sensitive data instance and the second sensitive data instance; determining a user with the privilege; and transmitting the first sensitive data instance and the second sensitive data instance to the user.
6. The method of any one of the preceding embodiments, wherein retrieving the first set of image representations for the set of sensitive data instances further comprises: retrieving first text corresponding to the first sensitive data instance; and generating a modified first text by removing a special character from the first text, wherein the modified first text comprises the first set of alphanumeric characters.
7. The method of any one of the preceding embodiments, wherein the first mapping template maps the first set of alphanumeric characters in the first sensitive data instance to the first set of color coding by: indicating a first color corresponding to a first alphanumeric character; and replacing the first alphanumeric character in the first set of alphanumeric characters with the first color to generate the first image representation.
8. The method of any one of the preceding embodiments, wherein the first mapping template maps the first set of alphanumeric characters in the first sensitive data instance to the first set of color coding by: indicating a first color gradient corresponding to a first alphanumeric character; and replacing the first alphanumeric character in the first set of alphanumeric characters with the first color gradient to generate the first image representation.
9. The method of any one of the preceding embodiments, wherein the first mapping template maps the first set of alphanumeric characters in the first sensitive data instance to the first set of color coding by: indicating a first color hue corresponding to a first alphanumeric character; and replacing the first alphanumeric character in the first set of alphanumeric characters with the first color hue to generate the first image representation.
10. The method of any one of the preceding embodiments, wherein the first mapping template maps the first set of alphanumeric characters in the first sensitive data instance to the first set of color coding by: indicating a first color saturation corresponding to a first alphanumeric character; and replacing the first alphanumeric character in the first set of alphanumeric characters with the first color saturation to generate the first image representation.
11. The method of any one of the preceding embodiments, wherein the first mapping template maps the first set of alphanumeric characters in the first sensitive data instance to the first set of color coding by: indicating a first color temperature corresponding to a first alphanumeric character; and replacing the first alphanumeric character in the first set of alphanumeric characters with the first color temperature to generate the first image representation.
12. The method of any one of the preceding embodiments, wherein clustering the first sensitive data instance and the second sensitive data instance into the first cluster based on similarities between the first image representation and the second image representation further comprises: generating a set of centroids, wherein each centroid indicates a position in a distribution space representing image representations of sensitive data instances; determining a plurality of distances, wherein each distance of the plurality of distances indicates a corresponding distance between a corresponding position of a corresponding image representation and each centroid of the set of centroids; based on determining the plurality of distances, generating a first set of assignments for the set of sensitive data instances, wherein each assignment of the first set of assignments assigns an associated image representation of the first set of image representations to an associated cluster of a set of clusters; and updating iteratively, based on the first set of assignments, the set of centroids based on generating a plurality of mean positions, wherein each mean position of the plurality of mean positions indicates a mean position of image representations associated with a given cluster of the set of clusters.
13. The method of any one of the preceding embodiments, wherein clustering the first sensitive data instance and the second sensitive data instance into the first cluster based on similarities between the first image representation and the second image representation further comprises: generating a similarity matrix, wherein a corresponding element of the similarity matrix represents similarity between a corresponding first test image representation and a corresponding second test image representation, and wherein the first set of image representations comprises the corresponding first test image representation and the corresponding second test image representation; updating a responsibility matrix iteratively, wherein a corresponding element of the responsibility matrix represents responsibility of the corresponding first test image representation to exhibit the corresponding second test image representation as a corresponding exemplar; updating an availability matrix iteratively, wherein a corresponding element of the availability matrix represents availability of the corresponding first test image representation to act as an exemplar to the corresponding second test image representation; and based on the responsibility matrix and the availability matrix, generating a set of assignments, wherein each assignment of the set of assignments links an associated image representation of the first set of image representations with a corresponding exemplar image representation of the first set of image representations.

14. The method of any one of the preceding embodiments, wherein clustering the first sensitive data instance and the second sensitive data instance into the first cluster based on similarities between the first image representation and the second image representation further comprises: determining a list of distances, wherein each distance in the list of distances characterizes a distance between a first test image representation and a second test image representation, wherein the list of distances is sorted by distance, and wherein the first set of image representations comprises the first test image representation and the second test image representation; determining, based on the list of distances, a density threshold parameter, wherein the density threshold parameter indicates a point of maximum curvature corresponding to a distance within the list of distances; and determining, based on the list of distances and the density threshold parameter, a set of clusters, wherein each cluster of the set of clusters comprises a corresponding plurality of image representations of the first set of image representations.

15. The method of any one of the preceding embodiments, wherein clustering the first sensitive data instance and the second sensitive data instance into the first cluster based on similarities between the first image representation and the second image representation further comprises: determining a required cluster size for the first cluster; and determining whether the first cluster corresponds to the required cluster size.

16. The method of any one of the preceding embodiments, wherein clustering the first sensitive data instance and the second sensitive data instance into the first cluster based on similarities between the first image representation and the second image representation further comprises: determining a required cluster percentage for the set of sensitive data instances; and determining a minimum amount of similarities required to cluster the first image representation and the second image representation into the first cluster based on the required cluster percentage.

17. A tangible, non-transitory, machine-readable (or computer-readable) medium storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system for performing data analytics on sensitive data in remote network environments without exposing content of the sensitive data by comparing sets of encrypted data, the system comprising:
   one or more processors; and
   a non-transitory, computer-readable medium storing instructions that, when executed by the one or more processors, cause operations comprising:
      retrieving a first encrypted mappings for a set of sensitive data instances, wherein the first encrypted mappings comprises:
         a first encrypted mapping for a first sensitive data instance for the set of sensitive data instances, wherein the first encrypted mapping comprises a first set of alphanumeric characters in the first sensitive data instance mapped using a first coding; and
         a second encrypted mapping for a second sensitive data instance for the set of sensitive data instances;
      clustering the first sensitive data instance and the second sensitive data instance into a first cluster based on similarities between the first encrypted mapping and the second encrypted mapping;
      retrieving a first instance identifier for the first sensitive data instance and a second instance identifier for the second sensitive data instance; and
      labeling the first instance identifier and the second instance identifier as corresponding to a duplicate.

2. A method for performing data analytics on sensitive data in remote network environments without exposing content of the sensitive data, the method comprising:
   retrieving a first encrypted mappings for a set of sensitive data instances, wherein the first encrypted mappings comprises:
      a first encrypted mapping for a first sensitive data instance for the set of sensitive data instances, wherein the first encrypted mapping comprises a first set of alphanumeric characters in the first sensitive data instance mapped using a first coding; and
      a second encrypted mapping for a second sensitive data instance for the set of sensitive data instances, wherein the second encrypted mapping comprises a second set of alphanumeric characters in the second sensitive data instance mapped using the first coding;
   clustering the first sensitive data instance and the second sensitive data instance into a first cluster based on similarities between the first encrypted mapping and the second encrypted mapping; and
   performing a first data analytics operation on the first cluster.

3. The method of claim 2, wherein the first set of alphanumeric characters in the first sensitive data instance is mapped using the first coding using a first mapping template, and wherein the first mapping template maps the first set of alphanumeric characters in the first sensitive data instance using the first coding by:
   indicating a first graphical element corresponding to a first alphanumeric character; and
   replacing the first alphanumeric character in the first set of alphanumeric characters with the first graphical element to generate the first encrypted mapping.

4. The method of claim 2, wherein the first set of alphanumeric characters in the first sensitive data instance is mapped using the first coding using a first mapping template, and wherein the first mapping template maps the first set of alphanumeric characters in the first sensitive data instance using the first coding by:
   indicating a first dimensional characteristic corresponding to a first alphanumeric character; and
   replacing the first alphanumeric character in the first set of alphanumeric characters with the first dimensional characteristic to generate the first encrypted mapping.

5. The method of claim 2, wherein the first set of alphanumeric characters in the first sensitive data instance is mapped using the first coding using a first mapping template, and wherein the first mapping template maps the first set of alphanumeric characters in the first sensitive data instance using the first coding by:
   indicating a first mapping characteristic corresponding to a first alphanumeric character; and
   replacing the first alphanumeric character in the first set of alphanumeric characters with the first mapping characteristic to generate the first encrypted mapping.

6. The method of claim 2, wherein the first set of alphanumeric characters in the first sensitive data instance is mapped using the first coding using a first mapping template, and wherein the first mapping template maps the first set of alphanumeric characters in the first sensitive data instance using the first coding by:
   indicating a first position in a vector space corresponding to a first alphanumeric character; and
   replacing the first alphanumeric character in the first set of alphanumeric characters with the first position in the vector space to generate the first encrypted mapping.

7. The method of claim 2, wherein the first set of alphanumeric characters in the first sensitive data instance is mapped using the first coding using a first mapping template, and wherein the first mapping template maps the first set of alphanumeric characters in the first sensitive data instance using the first coding by:
   indicating a first distance between positions in a vector space corresponding to a first alphanumeric character; and
   replacing the first alphanumeric character in the first set of alphanumeric characters with the first distance between positions in the vector space to generate the first encrypted mapping.

8. The method of claim 2, wherein retrieving the first encrypted mappings for the set of sensitive data instances further comprises:
   generating the first encrypted mapping at a first device in a network; and
   generating the second encrypted mapping at a second device in the network.

9. The method of claim 2, wherein performing the first data analytics operation on the first cluster further comprises:
   retrieving a first instance identifier for the first sensitive data instance;
   retrieving a second instance identifier for the second sensitive data instance; and
   labeling the first instance identifier and the second instance identifier as corresponding to a duplicate.

10. The method of claim 2, wherein performing the first data analytics operation on the first cluster further comprises:
    determining a privilege required to access the first sensitive data instance and the second sensitive data instance;
    determining a user with the privilege; and
    transmitting the first sensitive data instance and the second sensitive data instance to the user.

11. The method of claim 2, wherein retrieving the first encrypted mappings for the set of sensitive data instances further comprises:
    retrieving first text corresponding to the first sensitive data instance; and
    generating a modified first text by removing a special character from the first text, wherein the modified first text comprises the first set of alphanumeric characters.

12. The method of claim 2, wherein the first set of alphanumeric characters in the first sensitive data instance is mapped using the first coding using a first mapping template, and wherein the first mapping template maps the first set of alphanumeric characters in the first sensitive data instance using the first coding by:
    indicating a first color corresponding to a first alphanumeric character; and
    replacing the first alphanumeric character in the first set of alphanumeric characters with the first color to generate the first encrypted mapping.

13. The method of claim 2, wherein the first set of alphanumeric characters in the first sensitive data instance is mapped using the first coding using a first mapping template, and wherein the first mapping template maps the first set of alphanumeric characters in the first sensitive data instance using the first coding by:
    indicating a first color gradient corresponding to a first alphanumeric character; and
    replacing the first alphanumeric character in the first set of alphanumeric characters with the first color gradient to generate the first encrypted mapping.

14. The method of claim 2, wherein clustering the first sensitive data instance and the second sensitive data instance into the first cluster based on the similarities between the first encrypted mapping and the second encrypted mapping further comprises:
    generating a set of centroids; and
    determining a plurality of distances, wherein each distance of the plurality of distances indicates a corresponding distance between a corresponding position of a corresponding encrypted mapping and each centroid of the set of centroids.

15. The method of claim 2, wherein clustering the first sensitive data instance and the second sensitive data instance into the first cluster based on the similarities between the first encrypted mapping and the second encrypted mapping further comprises:
    generating a similarity matrix, wherein a corresponding element of the similarity matrix represents similarity between a corresponding first test encrypted mapping and a corresponding second test encrypted mapping, and wherein the first encrypted mappings comprises the corresponding first test encrypted mapping and the corresponding second test encrypted mapping;
    updating a responsibility matrix iteratively, wherein a corresponding element of the responsibility matrix represents responsibility of the corresponding first test encrypted mapping to exhibit the corresponding second test encrypted mapping as a corresponding exemplar;
    updating an availability matrix iteratively, wherein a corresponding element of the availability matrix represents availability of the corresponding first test encrypted mapping to act as an exemplar to the corresponding second test encrypted mapping; and
    based on the responsibility matrix and the availability matrix, generating a set of assignments, wherein each assignment of the set of assignments links an associated encrypted mapping of the first encrypted mappings with a corresponding exemplar encrypted mapping of the first encrypted mappings.

16. The method of claim 2, wherein clustering the first sensitive data instance and the second sensitive data instance into the first cluster based on the similarities between the first encrypted mapping and the second encrypted mapping further comprises:
- determining a list of distances, wherein each distance in the list of distances characterizes a distance between a first test encrypted mapping and a second test encrypted mapping, wherein the list of distances is sorted by distance, and wherein the first encrypted mappings comprises the first test encrypted mapping and the second test encrypted mapping;
- determining, based on the list of distances, a density threshold parameter, wherein the density threshold parameter indicates a point of maximum curvature corresponding to a distance within the list of distances; and
- determining, based on the list of distances and the density threshold parameter, a set of clusters, wherein each cluster of the set of clusters comprises a corresponding plurality of encrypted mappings of the first encrypted mappings.

17. The method of claim 2, wherein clustering the first sensitive data instance and the second sensitive data instance into the first cluster based on the similarities between the first encrypted mapping and the second encrypted mapping further comprises:
- determining a required cluster size for the first cluster; and
- determining whether the first cluster corresponds to the required cluster size.

18. The method of claim 2, wherein clustering the first sensitive data instance and the second sensitive data instance into the first cluster based on the similarities between the first encrypted mapping and the second encrypted mapping further comprises:
- determining a required cluster percentage for the set of sensitive data instances; and
- determining a minimum amount of similarities required to cluster the first encrypted mapping and the second encrypted mapping into the first cluster based on the required cluster percentage.

19. A non-transitory, computer-readable medium storing instructions that, when executed by one or more processors, cause operations comprising:
- receiving a first request to perform a first data analytics operation for a set of sensitive data instances;
- retrieving a first encrypted mappings for the set of sensitive data instances, wherein the first encrypted mappings comprises:
  - a first encrypted mapping for a first sensitive data instance for the set of sensitive data instances, wherein the first encrypted mapping maps a first feature in the first sensitive data instance using a first coding; and
  - a second encrypted mapping for a second sensitive data instance for the set of sensitive data instances, wherein the second encrypted mapping maps a second feature in the second sensitive data instance using the first coding;
- comparing the first sensitive data instance and the second sensitive data instance based on similarities between the first encrypted mapping and the second encrypted mapping; and
- performing the first data analytics operation on comparing the first sensitive data instance and the second sensitive data instance.

20. The non-transitory, computer-readable medium of claim 19, wherein the instructions for retrieving the first encrypted mappings for the set of sensitive data instances cause operations further comprising:
- generating the first encrypted mapping at a first device in a network; and
- generating the second encrypted mapping at a second device in the network.

* * * * *